United States Patent
Ruschke et al.

(10) Patent No.: US 6,375,381 B1
(45) Date of Patent: Apr. 23, 2002

(54) MACHINE ELEMENT/ASSEMBLY AND MAGNEFORM JOINT

(75) Inventors: Gary Steven Ruschke, Edison; Desi J. Fulenta, Lincoln Park, both of NJ (US)

(73) Assignee: Curtiss Wright Flight Systems, Inc., Fairfield, NJ (US)

( * ) Notice: Subject to any disclaimer, the term of this patent is extended or adjusted under 35 U.S.C. 154(b) by 0 days.

(21) Appl. No.: 09/478,633

(22) Filed: Jan. 6, 2000

(51) Int. Cl.$^7$ .................................................. B23P 15/14
(52) U.S. Cl. ........................................ 403/282; 403/261
(58) Field of Search ................................ 403/286, 267, 403/269, 282, 279, 261, 272; 219/603, 611; 464/181

(56) References Cited

U.S. PATENT DOCUMENTS

| | | |
|---|---|---|
| 2,976,907 A | 3/1961 | Harvey et al. |
| 4,006,993 A * | 2/1977 | Woerlee ...................... 403/359 |
| 4,125,000 A * | 11/1978 | Grob .......................... 403/359 |
| 4,513,488 A | 4/1985 | Arena |
| 4,523,872 A | 6/1985 | Arena et al. |
| 4,561,799 A | 12/1985 | Arena |
| 4,663,819 A * | 5/1987 | Traylor .................... 403/282 X |
| 4,807,351 A * | 2/1989 | Berg et al. .............. 403/282 X |
| 4,930,204 A * | 6/1990 | Schurter ...................... 403/278 |
| 5,230,661 A * | 7/1993 | Schreiber et al. ........... 464/181 |
| 5,419,217 A * | 5/1995 | Umezawa et al. ....... 403/282 X |
| 5,443,375 A * | 8/1995 | Cureton et al. ............. 403/265 |
| 5,553,964 A * | 9/1996 | Rouillot ...................... 403/279 |
| 5,692,853 A | 12/1997 | Litz et al. |
| 5,981,921 A * | 11/1999 | Yablochnikov ............. 219/603 |
| 5,983,478 A * | 11/1999 | Dolan et al. ................. 72/56 X |

OTHER PUBLICATIONS

Brown, 1969, Metals Handbook, 8$^{th}$ Edition, vol. 4: Forming, p. 256–264.

* cited by examiner

Primary Examiner—Lynne H. Browne
Assistant Examiner—David E. Bochna
(74) Attorney, Agent, or Firm—Klauber & Jackson

(57) ABSTRACT

A joint assembly is provide between a machine element gear and a shaft or between two shafts. The joint is brought about by forming a predetermined configured surface on the exterior of the machine element and forming a similar configuration of the same general dimensions on a raised surface on the shaft. The shaft is initially inserted into the machine element in a light force fit so that the similar predetermined configurations on the machine element and the raised surface of the shaft are in alignment. A metal cylindrical torque ring is positioned over and surrounding the two mating and abutting predetermined surfaces. By the process of magneforming, the cylindrical torque ring is deformed inwardly to be tightly pressed against the predetermined surfaces, thereby spanning the exterior of those surfaces and providing a tight joint between the machine element and the shaft. The machine element may be a variety of elements, including, but not limited to, a gear, a sprocket, a cam or a pulley or may even be the joining of two shafts.

11 Claims, 3 Drawing Sheets

MACHINE ELEMENT/ASSEMBLY AND MAGNEFORM JOINT

FIELD OF THE INVENTION

This invention relates to connection between two rotating components, and, more particularly, to an electromagnetically formed joint and method of forming the same to join a machine element, such as a gear, pulley, cam, sprocket and the like to a shaft for transmitting power between the machine element and the shaft.

BACKGROUND OF THE INVENTION

One of the most common mechanical elements in the design of machines and drive trains is the use of gears to transmit rotational power, and one typical type of gearing is bevel gears which are used universally to connect non-parallel shafts that may be intersecting or non-intersecting. The present invention, for convenience, will be described specifically with reference to bevel gears, however, it will readily be seen that the invention can be used to affix any type of gear to a gear shaft including, but not limited to, spur gears, worm gears, helical gears and the like. In similar manner, the invention can be used to secure cams, sprockets, pulleys to a shaft or even to unite other rotating components such as shafts Turning, however to t hie use of bevel gears to provide one illustration of the use of the invention, in general, the shafts of bevel gears meet and thus connect at an angle of 90 degrees, however, other angles are certainly used with the bevel gear connections.

In the construction of bevel gearing, generally the gears themselves are contained within a gearbox such that the ends of the operative shafts extend through the gearbox for connection to the input and output mechanisms through couplings. There are times where it is advantageous for the bevel gearbox to be constructed so as to have a two piece gear/shaft, that is, the gear is internally connected within the gearbox to a shaft that, in turn, extends external to the gearbox for further connection to a component.

There are various reasons to select a two piece gear/shaft and such rationale may depend upon the cost of the materials, machining and assembly time. In any event, the construction of a bevel gearbox containing a two piece gear/shaft is, at times, very desirable and an efficient, positive joint between the two components is therefore needed. One difficulty, however, is that the juncture of the bevel gear hub and the shaft is an important, crucial connection and must be strong yet be such that the joint is contained within the gearbox. Thus, the formation of such joint is critical and it would be advantageous to bring about an improvement in the strength of the joint as well as the ability to easily and reliably create that connection.

With current practice, the connection between the hub of a bevel gear, as well as the connection between most gears, is accomplished in a variety of ways, including the use of bolt flanges, splines, welding and the like and each technique has certain advantages and disadvantages.

The use of electromagnetic forming of metals is currently known and used in a variety of applications where the deformation of a conductive material is desired. In particular, the process, often called magneforming, is a technique that utilizes an intense transient magnetic field to shape metal and comprises the use of a formation of the magnetic field between a coil and the metal workpiece to be formed. The intense magnetic field is generated by means of a high pulse of electric current that is passed through the coil positioned near the metallic material to be deformed. As the intense magnetic field is generated, there is a powerful mutual repulsion created between the coil and the workpiece. The coil itself is made of substantially strong materials such that the repulsion stresses the workpiece beyond its yield strength and causes deformation in the desired amount.

The use of magneforming is shown and described in U.S. Pat. No. 2,976,907 in its basics and is further described for certain applications in U.S. Pat. No. 5,692,853 of Litz et al where the deformation is used to interfit threads of a joint together. Other examples of magneforming are found in U.S. Pat. No. 3,837,755; U.S. Pat. No. 4,513,488 and U.S. Pat. No. 4,561,799.

Accordingly, since the technology of magneforming exists, it would be advantageous to make use of that technology to solve a problem in the joining of the bevel gear, or, for that matter, any type of gear, to a shaft that would result in an efficient, strong and easily formed joint between those components.

SUMMARY OF THE INVENTION

Now, in accordance with the present invention, there is provided a joint adapted to be used between a hub of a bevel gear and a shaft that then extends from that gear and which joint can be easily formed. In the formation of the joint, the hub of the bevel gear is configured in a particular shape and an external configuration of the shaft affixed to the bevel gear is also configured to be in the same shape as the gear hub. In the preferred embodiment, the shape is that of a polygon and the invention will further be described with respect to that configuration, however, it will be seen that other configurations are applicable providing the gear hub and the shaft eternal configuration be similar so as to be aligned together abutting each other to form a contiguous surface to carry out the present invention. Thus, the two eternal surfaces of the components to be joined together are of the same polygon configuration and are aligned so as to mate with each other with the polygon shapes in alignment.

A metallic cylindrical torque ring surrounds the ends of the bevel gear hub and the end of the shaft affixed thereto and is deformed to be compressed about the polygonal surfaces of each of those components to join the bevel gear hub to the shaft. In carrying out the deformation, the cylindrical ring surrounds at least the two mating polygonal surfaces and the cylindrical ring is slightly longer than the combined length of the polygonal surfaces.

To effect the joint, therefore, a coil is located exteriorly of the metallic cylindrical torque ring and the intense charge of electric current applied to the coil. As the mutual repulsion is thus created between the exteriorly located coil and the metallic cylindrical torque ring, the coil is sufficiently strong to not deform, but that repulsion causes the cylindrical torque ring to deform inwardly to be tightly wrapped around the external polygonal surfaces of the hub of the bevel gear and the raised surface of the shaft, thereby forming a strong joint between the shaft and the bevel gear. The excess length of the cylindrical torque ring that extends beyond the combined lengths of the polygonal surfaces is also deformed inwardly and envelopes the free ends of those surfaces, thereby retaining the bevel gear to the shaft axially.

The deformation or compression of the cylindrical torque ring on to the joined bevel gear hub and shaft is relatively easy to carry out and yet the overall joint is a strong coupling and can be located within the gearbox of the bevel gears.

Additionally, the particular method of carrying out the joint is a low cost procedure and is readily adaptable to automated processes. In such joints, therefore, the resultant joint is strong and certainly capable of joining the bevel gear, or other type of gear, to a shaft and that joint is able to fit within and thus be fully located within the gearbox of the particular gearing.

Typical of such joints between a bevel gear hub and a shaft, the cylindrical torque ring carries pure torque between the shaft and the bevel gear as the thrust is transmitted directly into the raised portion of the shaft and not through the torque ring. As such, therefore, the actual coupling of the gear on to the shaft need only be a light press fit for purposes of accurate diametral location since the torque is actually transmitted between the gear hub and the raised surface of the shaft acting through the metallic torque ring. Therefore, an interference fit is not required to press the gear on to the shaft since the actual affixation of the gear to the shaft is not critical in transmitting torque between the two components. In addition, the axial thrust is carried by means of the gear hub abutting against a shoulder formed by the raised surface of the gear shaft which transmits the thrust load through the support bearing into the housing. Thus, doe to the construction of the joint of the present invention, the torque ring handles no radial loads and no axial loads but transfers only pure torque between the rotating components.

Thus, the joint between the two components and the method of making that joint can be carried out easily to provide a strong joint between the shaft and the hub of the bevel gear. The joint can be readily located within the gearbox of the bevel gears and yet the strength of the joint is such that it can easily transmit the torque between the bevel gear and the shaft extending external of the bevel gearbox. In similar fashion, the method of forming and the joint itself are equally applicable to other gears and machine elements and the joining of such other gears or machine elements to shafts or even the joining of shafts together.

Other features and advantages will become apparent to those skilled in the art from a review of the ensuing description which proceeds with reference to the following illustrative drawings:

DETAILED DESCRIPTION OF THE INVENTION

Figure 1:
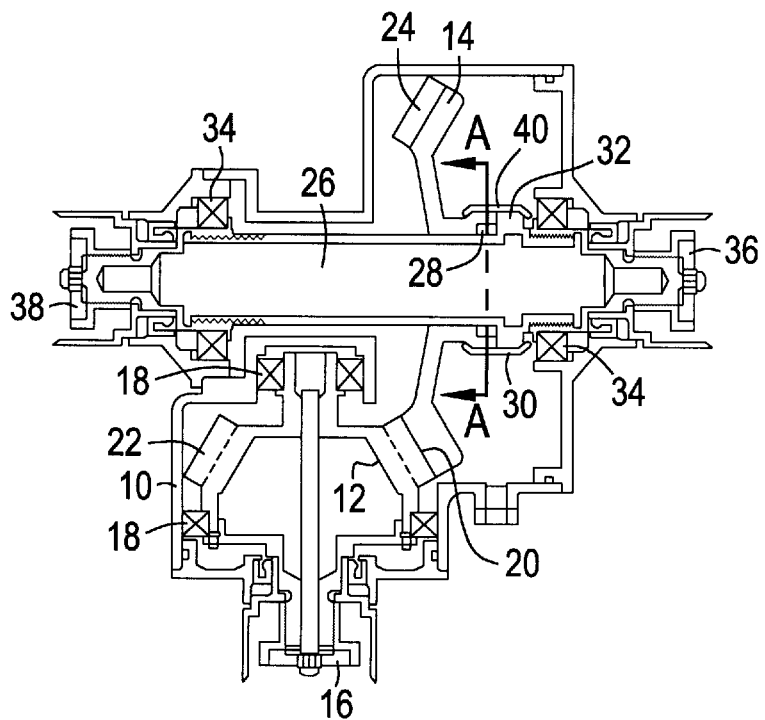
FIG. 1 is a cross-sectional view of bevel gears and a bevel gearbox that is conventionally in use today.

Turning first to FIG. 1, there is shown a side cross sectional view of a bevel gearbox 10 having an input bevel gear 12 and an output bevel gear 14 positioned within the gearbox 10. As previously stated, the present invention will be illustrated by reference to bevel gears as one embodiment, however, it will be seen that the present invention can be used to affix a large variety of machine elements to a shaft, including, but not limited to, cams, sprockets, pulleys or any other machine element that is required to be joined to a shaft, or even to the joining of two shafts together.

As can be seen, the gearbox 10 includes an input coupling 16 that enables the input bevel gear 12 to be connected to some source of rotational power. Within the gearbox 10, the input bevel gear 12 can be supported therein by conventional means such as bearings 18 that allow the input bevel gear 12 to rotate with respect to the gearbox 10. Again, in accordance with any conventional means, the input bevel gear 12 is affixed to the input coupling 16 so that the rotational power applied to the input coupling 16 is positively transmitted to the input bevel gear 12.

The output bevel gear 14 is, of course, rotationally meshed with the input bevel gear 12 at 20 where the teeth 22 of the input bevel gear 12 intermesh with the teeth 24 of the output bevel gear 14 in order to transmit the rotational power to the output bevel gear 14.

An output shaft 26 is provided and which is affixed to the output bevel gear 14. In the preferred embodiment, as will later be seen, the output bevel gear 14 can be simply pressed on to the output shaft 26 with a light press fit such that the hub 28 of the output bevel gear 14 abuts firmly against a shoulder 30 formed by a polygonal raised surface 32 machined into the output shaft 26.

The output shaft 26 is, as is conventional, mounted within the gearbox 10 by means of bearings 34 and at the ends of the output shaft 26 are provided output couplings 36 and 38. In the uses of bevel gears, of course, only one output coupling can be utilized, the use of two only being used herein for illustrative purposes.

The hub 28 of the output bevel gear 14 is also machined into the form of a polygon and that polygon is the same polygon as the polygonal raised surface 32 of the output shaft 26. Thus, the two polygonal shapes are located abutting each other and a cylindrical torque ring 40 deformed over the two complementary polygonal configurations to join the hub 28 of the output bevel gear 14 to the output shaft 26. The cylindrical torque ring 40, in order to be deformed by a magnet field must be of a metal, however the particular metal may vary. One preferred material is aluminum.

The method of deforming the cylindrical torque ring 40 to the shape shown in FIG. 1 will be later explained, it being seen, however, that the cylindrical torque ring 40 is a metallic material and its ends extend beyond the polygonal formation in the hub 28 and the polygonal raised surface 32. Thus, the ends of the cylindrical torque ring extend downwardly over the ends of the polygonal configuration of the hub 28 an the polygonal raised surface 32 to aid in retaining those polygonal configurations together.

As previously indicated, the use of the polygonal configuration is a preferred embodiment, however, it can readily be seen that other configurations can be used for the external surface of the hub 28 and the raised surface 32, it being only important that the configuration be generally complementary so as to present a uniform combined external surface for the application an deformation of the cylindrical torque ring.

Figure 2:
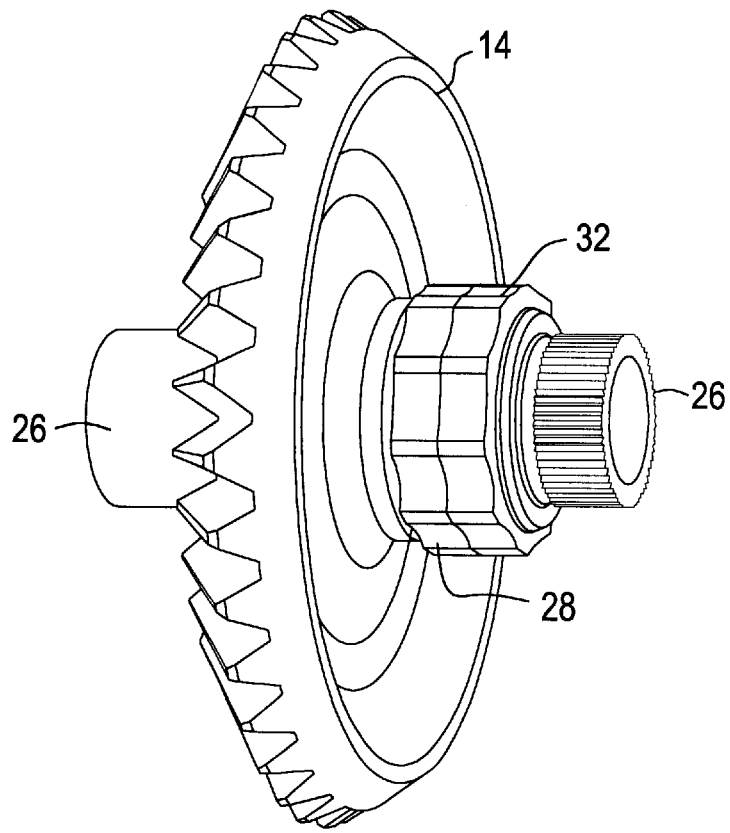
FIG. 2 is a perspective view of a bevel gear aligned with the polygonal raised surface on a shaft.

Turning now to FIG. 2, there is shown a perspective view of a bevel gear in alignment for the application of a cylindrical torque ring (not shown in FIG. 2). In the Fig, the output bevel gear 14 can be seen having its hub 28 abutting up against the polygonal raised surface 32 of the output shaft 26 and, as can be seen, those polygonal surfaces are aligned so that the surfaces are complementary to each other and form a contiguous exterior formation or surface. The alignment is relative easy to accomplish and is carried out, as will later become clear, when the output bevel gear 14 is lightly press fitted to the output shaft 26.

Figure 3:
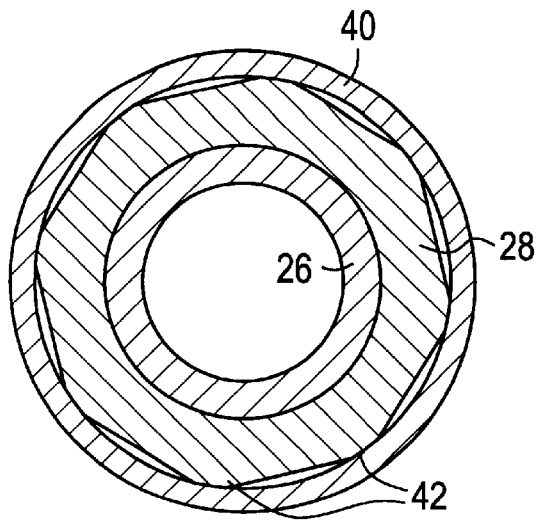
FIG. 3 is an end cross sectional view of one of the bevel gears of FIG. 1 showing the metallic torque ring in its preformed condition.
Figure 3A:
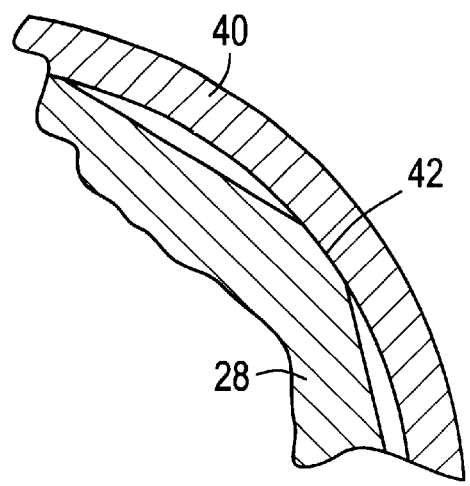
FIG. 3A is an enlarged end cross sectional view of a portion of the polygonal surface of the bevel gear and the metallic torque ring of FIG. 3.
Figure 4:
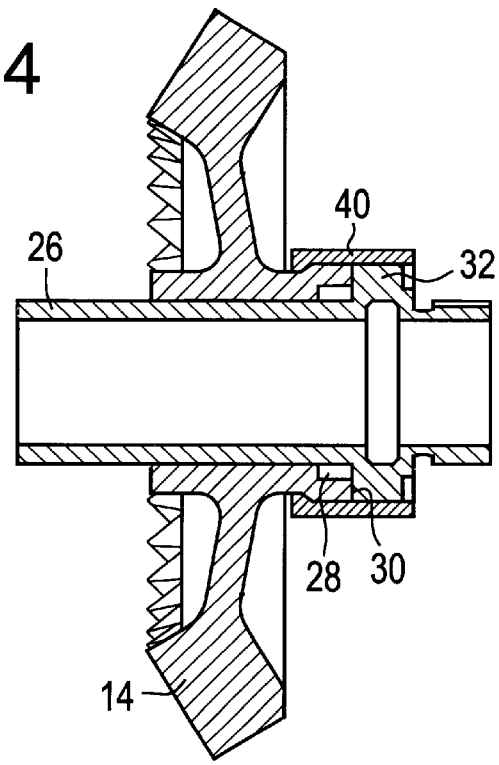
FIG. 4 is a side cross sectional view of a bevel gear with the metallic torque ring in the position of FIG. 3.

Turning now to FIGS. 3, 3A and 4, there are shown an end cross sectional view and a side cross sectional view of the output bevel gear 14 as shown in FIG. 1 with the cylindrical torque ring 40 in position prior to deformation thereof. As can be seen, the output bevel gear 14 is press fitted to the output shaft 26 so that the hub 28 of the output bevel gear 14 abuts against the shoulder 30 that is the leading edge of the polygonal raised surface 32. Again, the external surface of the hub 28 is formed into the same polygon as is the polygonal raised surface 32 such that the two polygons align against each other. Both polygonal surfaces can readily be machined in the hub 28 and the raised surface 32 of the output shaft 26 without special tooling and by simple machining techniques inasmuch as the tolerances are not particularly tight due to the later deformation of the cylindrical torque ring 40. Too, the cylindrical torque ring 40 can be made of differing materials, provided the material is a metal so that the process of deformation by magneforming can be effectively carried out. The actual polygon selected for the joint is dependent upon the particular joint and its application. Thus, the number of sides of the polygon is determined based on the diameter of the output shaft, the torque to be transmitted through the joint and the material of the cylindrical torque ring.

As also can be seen, specifically with respect to FIG. 3a, the intersecting flat surfaces of the polygonal are rounded corners as shown at 42 to a radius slightly smaller than the inside radius of the torque ring 40 and having the same center point. The rounded corners are thus rounded such that there is a significant decrease in the stress concentrations in the cylindrical torque ring 40 while leaving sufficient polygonal surface to carry the torque.

Figure 5:
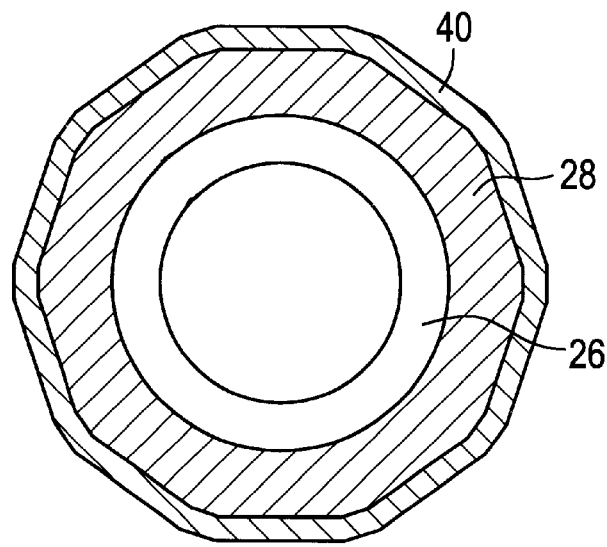
FIG. 5 is an end cross sectional view of a bevel gear with the metallic torque ring having been magneformed into its deformed configuration.
Figure 6:
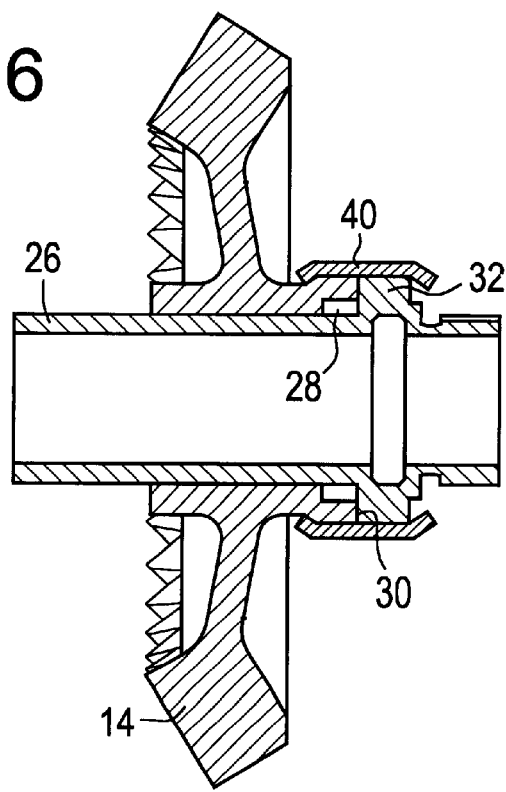
FIG. 6 is a side cross sectional view of the bevel gears of FIG. 1 with the metallic torque ring in the deformed configuration of FIG. 5.

Turning now to FIGS. 5 and 6, there shown, an end cross sectional view and a side cross sectional view of the output bevel gear 14 as shown in FIG. 1 with the cylindrical torque ring 40 in position after its deformation in accordance with the present invention. Accordingly as can be seen, the cylindrical torque ring 40 has been deformed such that it is tightly compressed against the polygonal shaped hub 28 of the output bevel gear 14 and the polygonal raised surface 32 of the output shaft 26, thereby forming a joint between those components. As previously indicated, the actual deformation of the cylindrical torque ring 40 is by means of magneforming, that is, a strong coil is positioned external of the cylindrical torque ring 40 when it is in the position shown in FIGS. 3 and 4.

An intense charge of electricity energizes the coil such that the coil and the cylindrical torque ring 40 are repelled. Since the coil is constructed of strong material, it remains rigid and the repelling force therefore act upon the cylindrical torque ring 40 to cause it to deform inwardly toward the hub 28 and the polygonal raised surface 32, causing the cylindrical torque ring 40 to deform about those components. The portion of the cylindrical torque ring 40 that is outside of those polygonal surfaces becomes curved inwardly by the deforming force, and those ends curls around the outer edges of the hub 28 and the polygonal raised surface 32 to retain those members even more firmly together.

Therefore, to summarize, the joint between the output bevel gear 14 and the output shaft 26 is created by magneforming a metallic cylindrical torque ring about the external matched polygonal surfaces formed on the mating ends of the hub 28 of the output bevel gear 14 and a raised surface on the output shaft. The output bevel gear 14 is light press fitted on to the output shaft where the hub 28 of the output bevel gear 14 presses tightly against a shoulder 30 of the polygonal raised surface of the output shaft 26 to prevent the imposition of trust forces acting upon the joint.

While the present invention has been set forth in terms of specific embodiments thereof, it will be understood in view of the instant disclosure, that numerous variation upon the invention are now enabled to those skilled in the art, which variations yet reside within the scope of the present teaching. Accordingly the invention is to be broadly construed and limited only by the scope and spirit of the claims now appended hereto.

We claim:

1. A combination of a shaft and a machine element, said combination comprising said machine element having an external polygonally configured surface, said machine element having an opening and said shaft press fitted into said opening in a light press fit thereto, said shaft having a raised surface with the same polygonal configuration as said external polygonally configured surface of said machine element, said external polygonally configured surface of said machine element and said raised polygonally configured surface of said shaft being in abutting relationship so as to form a contiguous polygonally configured surface, and a metal cylindrical torque ring deformed about and covering at least a portion of said external polygonally configured surface of said machine element and at least a portion of said raised polygonally configured surface of said shaft to secure said polygonal configurations together, thereby joining said machine element to said shaft.

2. A combination as defined in claim 1 wherein said machine element is a gear having a hub, and said external polygonally configured surface is on said hub.

3. A combination as defined in claim 2 wherein said external predetermined configured surface of said hub and said raised surface of said shaft are polygonal configurations.

4. A combination as defined in claim 2 wherein said polygonal configurations have intersecting flat surfaces that are rounded corners.

5. A combination as defined in claim 1 wherein said raised surface of said shaft includes a shoulder and wherein said hub of said gear is abutted against said shoulder to preclude axial loads on said torque ring.

6. A combination as defined in claim 1 wherein said metallic torque ring is tightly fitted over at least the entire external configured surface of said machine element and the entire raised surface of said shaft.

7. A combination as defined in claim 6 wherein said metallic torque ring has at least one end extending beyond at least one of said external configured surface of said machine element and said raised surface of said shaft and said at least one end of said torque ring curls around to envelope said at least one of said external configured surface of said machine element and said raised surface of said shaft.

8. A combination as defined in claim 7 wherein said metallic torque ring extends beyond both said external configured surface os said machine element and said raised surface of said shaft.

9. A combination as defined in claim 8 wherein said machine element is a machine element selected from the group consisting of a bevel gear, a spur gear, a worm gear, a sprocket, a cam and a pulley.

10. A joint assembly as for transmitting rotational power, said assembly comprising a gear having a opening and a gear shaft, said gear being affixed to said gear shaft in a light press fit through said opening, said shaft having a raised surface with a predetermined external configuration forming a shoulder facing said gear, said gear having a hub having the same external configuration as said raised gear, said hub and said raised surface adapted to abut against each other to alleviate axial loads between said gear and said shaft, and a torque ring tightly encircling at least a portion of said external configuration of said shaft and said external configuration of said hub to affix said gear and said shaft together and to transmit torque between said gear and said shaft.

11. A joint assembly as for transmitting rotational power between two machine elements, said assembly comprising a first machine element having an external surface of a polygonal configuration, a second machine element having an external surface having the same dimensions and in the same polygonal configuration as said external surface of said first machine element, means for mounting said first and said second machine elements in abutting relation to each other such that said external polygonally configured surfaces of said first and second machine elements are contiguous to each other, a torque ring encircling said external surfaces of said first and second machine elements at annular portions which extend longitudinally along each element from where the elements abut, thereby to form a joint between said elements, said mounting means further preventing the presence of radial or axial loads on said torque ring such that only torque is transmitted by said torque ring between said machine elements, said torque ring being in direct face to face contact with the entire external surfaces of said annular portions of each of the machine elements, and said torque ring being the sole means for transmitting the torque between said machine elements.

* * * * *